Figures 1, 2, 3, 4:
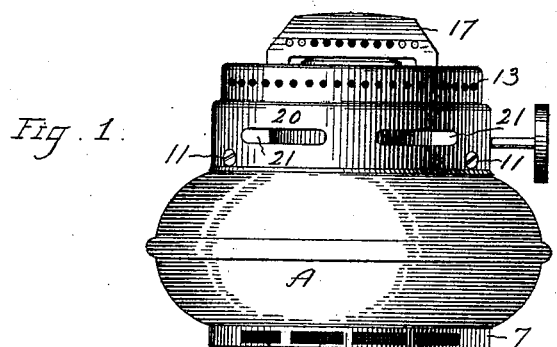

No. 614,916. Patented Nov. 29, 1898.
F. T. WILLIAMS.
LAMP.
(Application filed Dec. 26, 1896.)
(No Model.)

Witnesses

Inventor
Frank Theodore Williams
By James Shepard
Attys

UNITED STATES PATENT OFFICE.

FRANK THEODORE WILLIAMS, OF MERIDEN, CONNECTICUT, ASSIGNOR TO THE EDWARD MILLER & COMPANY, OF SAME PLACE.

LAMP.

SPECIFICATION forming part of Letters Patent No. 614,916, dated November 29, 1898.

Application filed December 26, 1896. Serial No. 616,974. (No model.)

*To all whom it may concern:*

Be it known that I, FRANK THEODORE WILLIAMS, a citizen of the United States, residing at Meriden, in the county of New Haven and State of Connecticut, have invented certain new and useful Improvements in Lamps, of which the following is a specification.

My invention relates to improvements in lamps; and the main object of my improvements is greater efficiency.

In the accompanying drawings, Figure 1 is a side elevation of my lamp. Fig. 2 is a central vertical section thereof on a plane extending transversely to the width of the wick-tube. Fig. 3 is a plan view of the upper portion of my lamp, and Fig. 4 is a like view of the same with the deflector removed.

A designates the lamp-fount, which in its main features may be of any ordinary construction. It is provided with an ordinary draft-tube 5, open at both ends and extending from the top of the burner-base 6 to the bottom of the fount. Under the bottom of said fount I form a shallow air-chamber 7 with an imperforate bottom wall 8, but with a series of openings 9 at the side edge of said chamber, as shown. The burner-base 6 is provided with a flat wick-tube 10, rigidly secured thereto. Over the burner-base and surrounding the said wick-tube is the removable burner-deck 20, perforated at its top for the passage of said wick-tube. As shown, it is attachably and detachably secured by means of screws 11, which pass through its sides and into suitable lugs 12 on the top of the lamp-fount. This deck is provided with a series of fine perforations 13 in the sides a little distance below its top and with larger perforations 21 below the top of the burner-base and above the top proper of the lamp-fount. The top of said deck, in addition to its wick-receiving perforation, is provided with perforations arranged mainly in an inner and outer series 14 and 15 to admit air simultaneously to the outside and inside of the tubular deflector. Surrounding the wick-tube I secure to the top of said deck the baffle-plate 16, whose base or lower edge comes closely to the wick-tube 10, while its sides and ends are spread out and flare away from the wick-tube as they extend upwardly. Over the baffle-plate 16 I secure the tubular deflector 17, the same being of a pyramidal form—that is to say, of substantially a rectangular and tapering tube larger at the base than at the top and with portions of its base resting on the top of the deck. It may be secured to the deck in any proper manner. As shown, it is secured by four prongs 18, Fig. 2, that extend through the four holes 19 shown in the top of the deck in Fig. 4. This deflector is provided with a horizontal series of perforations 22, substantially on a level with the top of the baffle-plate, to admit air over the top of said baffle-plate, tending to prevent the flame from being put out by a sudden jar. The series of perforations 14 outside of the tubular deflector tend to make the flame stand up and not spread laterally too much.

My lamp is particularly adapted for lanterns, and by the construction shown and described I secure good combustion and produce a lamp well adapted for burning without flickering or going out when subjected to strong drafts.

While I prefer to employ the bottom air-chamber in connection with my burner, it is evident that the same might be omitted, if desired. It is also evident that this bottom air-chamber can be used with central-draft lamps whether or not the decks and burners are like those herein shown.

I claim as my invention—

1. In a lamp having a burner-deck, the combination of a wick-tube, the baffle-plate mounted on said deck and surrounding the wick-tube, immediately above the top of said deck, the upper edge of said baffle-plate being about midway between the top of said deck and the upper end of said wick-tube, and the tapering deflector also mounted on said deck and completely surrounding said baffle-plate and wick-tube, substantially as described.

2. A lamp having a burner-deck perforated for the passage of the wick-tube, a burner-base on the top of the fount, the wick-tube mounted on said base and projecting through and above the top of said deck, the baffle-plate mounted on said deck and surrounding the wick-tube, the tapering deflector surrounding said baffle-plate, and means for readily attaching and detaching the said deck to and from the said base and wick-tube, substantially as described.

3. A lamp having a burner-base on the top of its fount, a burner-deck mounted thereon above said burner-base and having perforations in its side walls with an inner and outer series of perforations in its top, the baffle-plate and surrounding tubular deflector arranged relatively to said top perforations with one series thereof outside of the tubular deflector and the other series inside of the tubular deflector and outside of the said baffle-plate, substantially as described.

4. A lamp having a burner-deck with the baffle-plate on its top, the tapering tubular deflector surrounding said baffle-plate and having a horizontal series of perforations substantially on a level with the top of said baffle-plate, the top of said deck having a series of perforations inside of the said tubular deflector and outside the base of the baffle-plate and another series of perforations outside of the said tubular deflector substantially as described.

FRANK THEODORE WILLIAMS.

Witnesses:
LOUIS W. STADTMILLER,
I. B. MILLER.